United States Patent
Hammes et al.

(10) Patent No.: US 7,755,336 B2
(45) Date of Patent: Jul. 13, 2010

(54) INTEGRATED SEMICONDUCTOR COMPONENT AND METHOD FOR CONTROLLING A SUPPLY VOLTAGE OF A FUNCTIONAL CIRCUIT IN AN INTEGRATED SEMICONDUCTOR COMPONENT

(75) Inventors: Markus Hammes, Dinslaken (DE); Christian Kranz, Ratingen Lintorf (DE)

(73) Assignee: Infineon Technologies AG, Nuebiberg (DE)

( * ) Notice: Subject to any disclaimer, the term of this patent is extended or adjusted under 35 U.S.C. 154(b) by 334 days.

(21) Appl. No.: 11/859,515

(22) Filed: Sep. 21, 2007

(65) Prior Publication Data
US 2008/0079402 A1    Apr. 3, 2008

(30) Foreign Application Priority Data
Sep. 28, 2006    (DE) .................. 10 2006 045 902

(51) Int. Cl.
    G05F 1/40    (2006.01)
(52) U.S. Cl. ...................................... 323/268
(58) Field of Classification Search ............... 323/268, 323/269, 271–273
    See application file for complete search history.

(56) References Cited

U.S. PATENT DOCUMENTS

| | | | | |
|---|---|---|---|---|
| 5,418,353 | A | * | 5/1995 | Katayama et al. ........... 235/380 |
| 5,777,399 | A | * | 7/1998 | Shibuya ........................ 307/66 |
| 6,630,845 | B2 | * | 10/2003 | Boucher ....................... 326/83 |
| 6,737,839 | B2 | * | 5/2004 | Hiraki et al. ................ 323/268 |
| 7,098,636 | B2 | | 8/2006 | Koerner et al. |
| 7,211,991 | B2 | | 5/2007 | Balakrishnan et al. |
| 2002/0196005 | A1 | | 12/2002 | Hiraki et al. |
| 2005/0017341 | A1 | | 1/2005 | Egerer |

FOREIGN PATENT DOCUMENTS

| | | |
|---|---|---|
| DE | 42 33 078 A1 | 4/1993 |
| DE | 10 2005 045 995 A1 | 4/2007 |
| GB | 2 310 570 A | 8/1997 |
| WO | WO 02/084467 A2 | 10/2002 |

* cited by examiner

*Primary Examiner*—Matthew V Nguyen
(74) *Attorney, Agent, or Firm*—SpryIP, LLC

(57) ABSTRACT

An integrated semiconductor component includes a functional circuit and a power control circuit configured to generate a supply voltage from an input voltage. The power control circuit may include a snitching controller and a control circuit configured to set a frequency spectrum of tile Supply voltage and coupled to the switching controller. The control circuit may be configured to determine a current operating state out of at least two possible operating states of the integrated semiconductor component and to set the frequency spectrum dependent from the current operating state.

23 Claims, 3 Drawing Sheets

INTEGRATED SEMICONDUCTOR COMPONENT AND METHOD FOR CONTROLLING A SUPPLY VOLTAGE OF A FUNCTIONAL CIRCUIT IN AN INTEGRATED SEMICONDUCTOR COMPONENT

REFERENCE TO RELATED APPLICATIONS

This application claims the benefit of the priority date of German application DE 10 2006 045 902.4, filed on Sep. 28, 2007, the contents of which are herein incorporated by reference in their entirety.

FIELD OF THE INVENTION

Embodiments of the present invention relate generally to an integrated semiconductor component and a method for controlling a supply voltage of a functional circuit in an integrated semiconductor component.

BACKGROUND OF THE INVENTION

In an integrated semiconductor component, various functional blocks, e.g. various functional circuits, are often requested. In particular, due to the continuing integration of different functionalities into one component, analogue functional circuits such as e.g. a transceiver circuit, and digital functional circuits such as e.g. a digital signal processor or DSL or a microcontroller may be integrated into a single integrated semiconductor component. Due to the higher integration, different components of a terminal device may be brought together in one integrated semiconductor component, so that by using less components, the costs of manufacturing of a terminal device may substantially be reduced. Thus, it is desirable that as many functional circuits as possible are integrated into one integrated semiconductor component.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in vehicle.

DETAILED DESCRIPTION OF THE INVENTION

Figure 1:
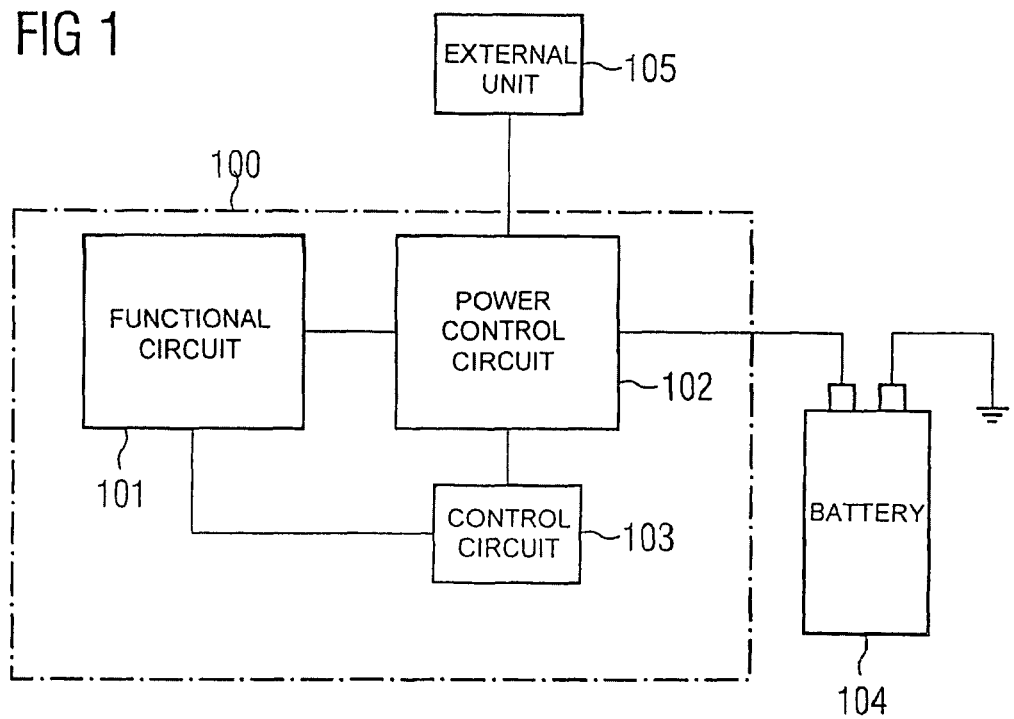
FIG. 1 shows a schematic representation of an integrated semiconductor component in accordance with an embodiment of the invention.

One functional block (e.g. functional circuit) of a terminal device, in particular of a mobile terminal device, is a power control circuit, which may also be referred to as power management unit (PMU). The power control circuit provides a supply voltage or a supply current to a functional block or to an external circuit coupled with an integrated semiconductor component. With the provision of the supply voltage or the supply current, the power control circuit controls the power consumption of the functional block or of various functional blocks or of the external circuit.

In particular within a mobile terminal device such as e.g. a mobile phone or a cellular phone, which is supplied with the required power by means of a battery or an accumulator, the power control circuit serves to derive the supply voltage or the supply current from the battery voltage or the accumulator voltage. In this case it may be necessary that the supply voltage, which is supplied to a functional block, is different from the battery voltage. Another reason to derive the supply voltage from the battery voltage may be seen in that the battery voltage varies with a charging state of the battery, whereas the supply voltage, which is provided to a functional block or to an external unit or circuit, should be kept as constant as possible in some instances.

When integrating the power control circuit, the power control circuit produces additional lost heat in the integrated semiconductor component. The lost heat is inter alia dependent on which voltage difference exists between the input Voltage of the power control circuit, i.e. for example the battery voltage, and the voltage to be controlled. Additionally, the lost heat is dependent on a flowing current and the type of the power control circuit. The power control circuit may include, depending on the respective type of power control circuit, a linear controller or a switching controller, which may also be referred to as DC/DC controller.

The lost heat may result in an increase of the temperature of the integrated semiconductor component, which should be dissipated through a package of the integrated semicontroller component. The actually dissipated lost heat is, in one embodiment, dependent on the thermal resistance of tile package material or the shape design of the integrated semiconductor component. Due to the lost heat remaining in the integrated semiconductor component, its temperature increases compared with the ambient temperature. The difference between the temperature of the integrated semiconductor component and the ambient temperature may not exceed a certain value in some instances, and it is dependent on the technology used for manufacturing the integrated semiconductor component. Taking into consideration the different parameters such as e.g. the thermal resistance of the package material or the thermal resistance of the printed circuit board, that the integrated semiconductor component is arranged on, this results in a maximum ambient temperature in which a terminal device can be used. Therefore, it is desirable that the maximum ambient temperature can be selected as high as possible.

In order to keep the power loss of the power control circuit and thus its contribution to the lost heat as low as possible and at the same time to optimize the current consumption of the mobile terminal device, usually, the power control circuit includes a switching controller. During its operation, the switching controller may be controlled by means of a periodic control signal having a settable switching frequency.

The switching signals used for the operation of the switching controller produce spectral components on the switching frequency and the associated or corresponding harmonic waves. In the case where the power control circuit is integrated in particular with an analog functional block into an integrated semiconductor component, an interference of the signal processing in tile analog functional block may occur due to the spectral components. This holds true in particular in the case where the analog functional block is a high frequency sensitive unit, i.e. in the case where the analog functional block is designed for the carrying out of a signal processing at a radio frequency or of an audio signal processing.

In one embodiment of the invention, an integrated semiconductor component is provided which may reduce the interference in a functional block, in particular but not exclusively, in an analog functional block, which are produced by spectral components of a switching signal of a switching controller.

In one embodiment of the invention, an integrated semiconductor component is provided, which includes a functional block or a functional circuit and a power control circuit configured to generate a supply voltage from an input voltage. The power control circuit includes a switching controller and a control circuit configured to set a frequency spectrum the supply voltage. The control circuit is configured to determine a current operating state from at least two possible operating states of the integrated semiconductor component and to set the frequency spectrum dependent on the current operating state.

Thus, the frequency spectrum of the supply voltage in one embodiment may be set in the integrated semiconductor component based on an operating state, such as an operating stale of the functional block. Tile supply voltage may be provided to the functional block. The supply voltage may also be provided to another unit or circuit such as e.g. to a second functional block or to an external functional unit of the integrated semiconductor component. The supply voltage may include a frequency spectrum, which is produced due to the operation of the switching controller. In one embodiment the frequency spectrum is determined by the switching time instants, at which the switching controller is closed. This frequency spectrum may couple to signals being processed in the functional block. The resulting coupling causes interferences of the signal processing in the functional block or in the external unit when the frequency spectrum has at least one maximum near characteristic frequencies of the signal processing. The characteristic frequencies of the signal processing are possibly dependent from a selected functional state of the functional block and may change correspondingly.

In one embodiment of the invention, the frequency spectrum is settable based on a selected operating state. Thus the frequency spectrum is selected based on the characteristic frequencies unique to the operating state. In one embodiment, the frequency spectrum may be shifted in order to achieve a coupling to the signals to be processed, which is as small as possible in one operating state. It is also possible that a frequency spectrum is selected having a coupling being as small as possible in a particular interference-sensitive operating state, whereas in a second operating state, which is not as interference-sensitive, a frequency spectrum is set which more strongly couples to the signals to be processed. Thus, a very flexible operation of the integrated semiconductor component is made possible which takes into consideration different boundary conditions such as e.g. limited power supply or a small interference spectrum, depending oil the requirement.

In another embodiment of the invention, a method for controlling a supply voltage of a functional circuit in an integrated semiconductor component is provided. In this embodiment, the method includes determining a current operating state of the integrated semiconductor component, and setting a switching spectrum of a switching signal for a switching controller arranged in a power control circuit, based on the current operating state.

In one embodiment of the invention, the power control circuit includes a linear controller which is connected in parallel with the switching controller.

A parallel connection of the linear controller and the switching controller makes it possible in a simple manner to set the frequency spectrum of the supply voltage. In one embodiment, during the operation of the switching controller, a predetermined first frequency spectrum is generated by the switching process. During the operation of the linear controller a direct current voltage portion (DC portion) exists. In this case, a second frequency spectrum is set, which substantially has a signal at a frequency f=0. Thus, the frequency spectrum may be set in a simple manner by means of switching between an operation with a linear controller and an operation with a switching controller. Such a switching may also be carried out automatically by means of a suitable selection of the voltage at the switching controller and the voltage at the linear controller.

In one embodiment of the integrated semiconductor component, the linear controller may be coupled to the functional block or the functional circuit. This makes it possible to provide a supply voltage to the functional block or the functional circuit by means of the linear controller.

In another embodiment of the integrated semiconductor component, the power control circuit provides a supply voltage to the functional block or the functional circuit. Thus, the supply voltage to the flectional block or the functional circuit is provided by the power control circuit, which may couple the supply voltage of the functional block or the functional circuit to the signal processing in the functional block or the functional circuit as little as possible.

In one embodiment of the integrated semiconductor component, the power control circuit provides a supply voltage to an external circuit. Thus, also an interference to the signal processing of the functional block or the functional circuit, which is generated by a supply voltage to an external unit, may be kept as small as possible. A possible external unit or external circuit may e.g. be a power amplifier, a further integrated semiconductor component, a light emitting diode, a display, etc.

In an embodiment of the integrated semiconductor component, the functional block or the functional circuit includes a transceiver circuit and is thus in particular susceptible to interferences by other high frequency signals, such as e.g. the switching signal of the switching controller, as being a high frequency-sensitive circuit.

In one embodiment of the integrated semiconductor component, a first operating state is a transmitting state of the transceiver circuit and a second operating state is a receiving state of the transceiver circuit.

In an embodiment of the integrated semiconductor component, the switching controller is operable with a first switching frequency or with a second switching frequency.

In one embodiment of the integrated semiconductor component, the first switching frequency and the associated harmonic switching frequencies are different from an internal reference frequency of the functional circuit. Thus, a particularly small coupling of the switching signal to the reference signal may be achieved.

In an embodiment of the integrated semiconductor component, the internal internal reference frequency is an oscillator signal of a local oscillator of the functional circuit or the functional block.

In one embodiment of the integrated semiconductor component, the internal reference frequency is a clock frequency of the functional circuit or the functional block.

In an embodiment of the method, a current operating state is a receiving state of the integrated semi controller component.

Furthermore, in another embodiment of the method, a switching spectrum of the switching signal is different from a receiving frequency of the integrated semiconductor component, so that the switching frequency does not couple to receiving signals and does not interfere with those.

Furthermore, in another embodiment of the method, all harmonic waves of the switching signal are outside a receiving spectrum of the integrated semiconductor component. This may achieve as small a coupling as possible of the switching signal to the receiving spectrum.

FIG. 1 shows a schematic representation of an integrated semiconductor component 100 in accordance with an exemplary embodiment of the invention.

The integrated semiconductor component 100 includes a functional block (e.g. a functional circuit) 101, which is coupled to a power control unit (e.g. a power control circuit) 102, e.g. via a conductor or line. The functional block 101 is coupled to a control unit (e.g. a control circuit) 103, e.g. via a control conductor or control line. The power control unit 102 is coupled to a battery unit 104, which is arranged outside the integrated semiconductor component 100, e.g. via a connecting conductor or connecting line. Furthermore, the power control unit 102 is coupled to an external unit 105 (e.g. a integrated semiconductor component external unit), e.g. via a supply conductor or supply line. The control unit 103 is coupled to the power control unit 102, e.g. via a control conductor or control line.

The battery unit 104, vehicle may in one embodiment be configured as an accumulator, provides an external supply voltage, with which the integrated semiconductor component 100 is operated. The external supply voltage is supplied to the power control unit 102 e.g. via the connecting conductor or connecting line. The power control unit 102 includes at least one switching controller, which is not shown in FIG. 1. Using the switching controller, the power control unit 102 converts the external supply voltage into a first supply voltage, which the power control unit 102 provides to the functional block 101, e.g. via the conductor or line. Furthermore, the power control unit 102 provides a second supply voltage to the external unit 105.

In one embodiment the first supply voltage and the second supply voltage have different values and may be determined independent and separate from each other in the power control unit 102. The functional block 101 may be a transceiver (transmitter-receiver) unit, in one embodiment, which is provided in the integrated semiconductor component 100. The functional block 101 may also be another analog or digital signal processing unit. In all embodiment of the invention, the external unit 105 may be an external signal amplifier, an acoustical converter or optical converter or a microphone, a loudspeaker, or a light emitting diode, for external. Furthermore, other devices are conceivable as the external unit 105, which are supplied with the second supply voltage, and such alternatives are contemplated as falling within the scope of the invention.

The control unit 103 sets the switching frequency of the switching controller provided in the power control unit 102. The setting is based on a current operating state of the functional block 101. Tile current operating state or current functional state is indicated to the control unit 103 by means of a control signal which is transmitted from the functional block 101 or functional unit 101, e.g. via the the control conductor or control line. The control with 103 selects a switching frequency for the switching controller based on the transmitted control signal. The harmonic waves or the higher harmonics of the switching frequency are associated with the switching frequency, so that a frequency spectrum of the switching controller is thereby set. Furthermore, it is conceivable in one embodiment that the switching controller is switched with a predetermined frequency only in a first operating state or functional state, whereas the switching controller is not switched at all in another operating state or functional state.

Figure 2:
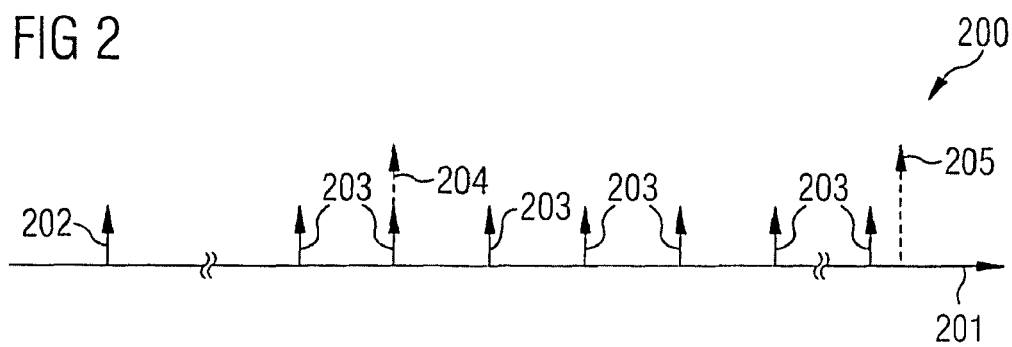
FIG. 2 shows a schematic representation of a switching spectrum of a switching controller in accordance with an embodiment of the invention.

Using a transceiver unit as an example of the functional block 101, the operation of the integrated semiconductor component 100 in accordance with an exemplary embodiment of the invention will be described in more detail below. To do this, FIG. 2 shows a schematic representation 200 of a switching spectrum of tile switching controller.

A frequency region is shown on the abscissa 201. A switching frequency 202 is indicated, its higher harmonics 203, i.e. all integer multiples of the switching frequency 202, a transmitting frequency 204 and an oscillator frequency 205.

In one embodiment a transceiver unit includes a frequency generator, which provides a transmitting frequency and/or a receiving frequency for modulating or demodulating the user data. For this purpose, the frequency generator includes an oscillator, which may be configured as voltage controlled oscillator (VCO), for example. The oscillator has its proprietary oscillator frequency, e.g. the oscillator frequency 205.

The switching frequency 202 of the switching controller is selected based on the high frequency used, i.e. the transmitting frequency 204 or a receiving frequency, which is not shown in the drawings. The selection is carried out such that higher harmonics 203 of the switching frequency 202 fall exactly onto the center of the radio frequency channel of a transmission channel. In the case of a receiving channel, a suitable selection for the frequency position of the higher harmonics 203 may also be carried out. Those may be selected dependent from the used receiving concepts such as e.g. the so-called direct-conversion principle or the so-called LOW-IF principle, etc. In one embodiment of the invention, the harmonic waves, i.e. the higher harmonics 203, are selected such that they fall into the neighbor channels of the receiving region, whereas no harmonic Waves exist in the use channel. In the case of the transmitting operation of the transceiver unit, the higher harmonics 203 of the switching frequency 202 can be selected such that one harmonic of the harmonics 203 falls exactly on the transmitting frequency 204 as shown in FIG. 2. In this case, however, it is looked after that the higher harmonics 203 do not fall on the same frequency as the oscillator frequency 205. Thus, an interference of the transceiver unit is reduced or minimized. In other words, in the mentioned example, the carrier frequency for the transmission case, i.e. the sending case, is an integer multiple of the switching frequency 202, whereas in the receiving case, the higher harmonics or all integer multiples of the switching frequency 202 do not fall on the receiving frequency as the carrier frequency.

As an alternative to the high frequency channel dependent switching frequency 202, the switching frequency 202 may also be modulated such that e.g. a so-called "dither" is generated. Thus, instead of the comb spectrum, a frequency depending, a continuous function may be implemented for the higher harmonics 203. Also in this case, the modulation or the modulation function can be selected based on the channel frequency and the transmitting frequency or transmitting frequencies and the receiving frequency or receiving frequencies such that the interferences with the switching frequencies are reduced or minimized.

Figure 3:
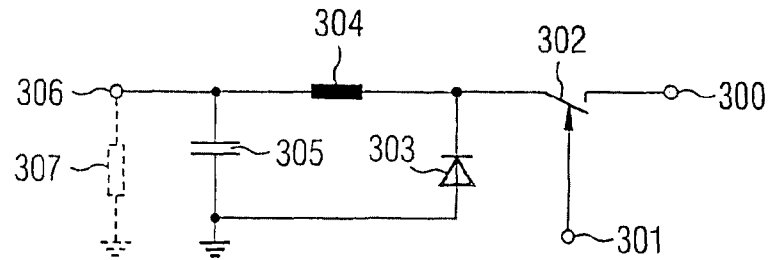
FIG. 3 shows a schematic representation of a switching controller in accordance with an embodiment of the invention.

FIG. 3 shows a schematic representation of a switching controller according to one embodiment. The switching controller includes an input 300, at which an input voltage can be provided. The input 300 is coupled with a switching element 302. The switching element 302 includes a control input 301. A control signal can be provided at the control input 301, with which control signal the switching element 302 can be switched into a closed state or an opened state. An output of the switching element 302 is coupled with an inductance 304. The inductance 304 is coupled with an output 306 of the switching controller. Furthermore, the output of the switching element 302 is coupled with an output of a diode 303. An input of the diode 303 is connected to the output 306 via a capacitor 305. The output of the diode 303 is further coupled with a reference potential terminal, in the drawing (FIG. 3) represented as a ground terminal. A load 307 may be connected to the output 306, wherein the switching controller provides a supply voltage for the load 307. The supply voltage is generated from the input voltage provided at the input 300.

In one embodiment of the invention, the switching controller is an electronic Circuit for voltage conversion. For storing the energy, the inductance 304 is used. The storage of the energy may be necessary in one embodiment in order to keep the output voltage at the output 306 as constant as possible during the switching of the switching element 302. The capacitor 305 serves as an additional energy storage in this case. The control of the setting of the switching element 302 can in this case be selected in accordance with different methods corresponding to the way of application of the switching controller. 13. By way of example, the so-called "voltage mode", in which the switching element 302 is switched, in one embodiment, such that a back-coupling, loop takes into account the output voltage and the input voltage, may be possible. In another embodiment, an operation in the so-called "current mode", in which the back-coupling loop controls the switching controller in addition to the output voltage and the input voltage by means of the current at tile output 306 of the switching controller, is also conceivable.

Figure 4:
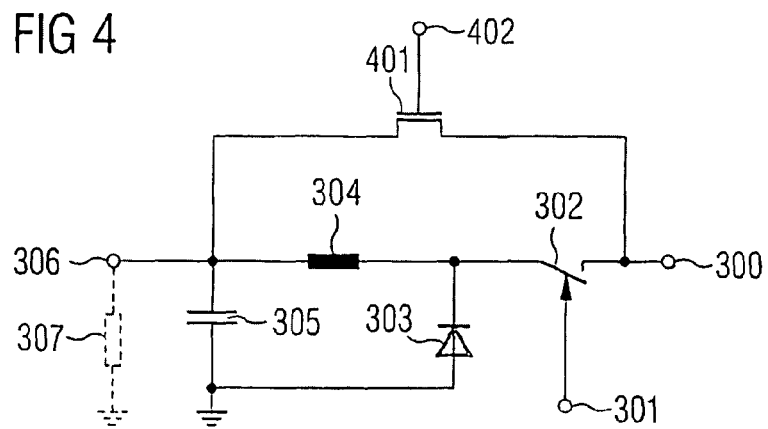
FIG. 4 shoves a schematic representation of a power controller in accordance with an embodiment of the invention.

FIG. 4 shovers a schematic representation of a power controller as it may be used in accordance With another embodiment of the invention. The power controller in FIG. 4 is different from the switching controller of FIG. 3 with respect to some elements, wherein the same reference numerals are used to designate elements having a similar effect. As the switching controller in FIG. 3, the power controller of FIG. 4 includes an input 300, which is coupled with an output of the power controller 306 via a switching element 302 and an inductance 304. A back-coupling loop is formed in parallel with the inductance 304, wherein the back-coupling loop leads via a capacitor 305 being arranged at the output side and a diode 303 to a terminal of the inductance 304 being arranged at the input side. The switching element 302 is coupled with a control input 301, wherein a control signal is supplied to the control input 301, wherein the power controller is operated using the control signal. A load 307 can be connected to the output 306 of the power controller, wherein a constant voltage or a constant output current is provided to the load 307. The power controller shown in FIG. 4 differs from the switching;, controller of FIG. 3 by means of a linear controller 401, which is connected in parallel with the switching element 302 and the inductance 304. In FIG. 4, the linear controller 401 is shown as an MOS transistor, the source drain passage of which is connected in parallel with the switching controller of FIG. 3. The gate terminal of the linear controller 401 is coupled with a second control input 402. The linear controller 401 can be operated via the second control input 402, which is supplied with a second control signal. The power controller is thus enabled to be operated as a linear controller its well as a switching controller. This will also be described in more detail below also in the context of the embodiment of FIG. 5.

Figure 5:
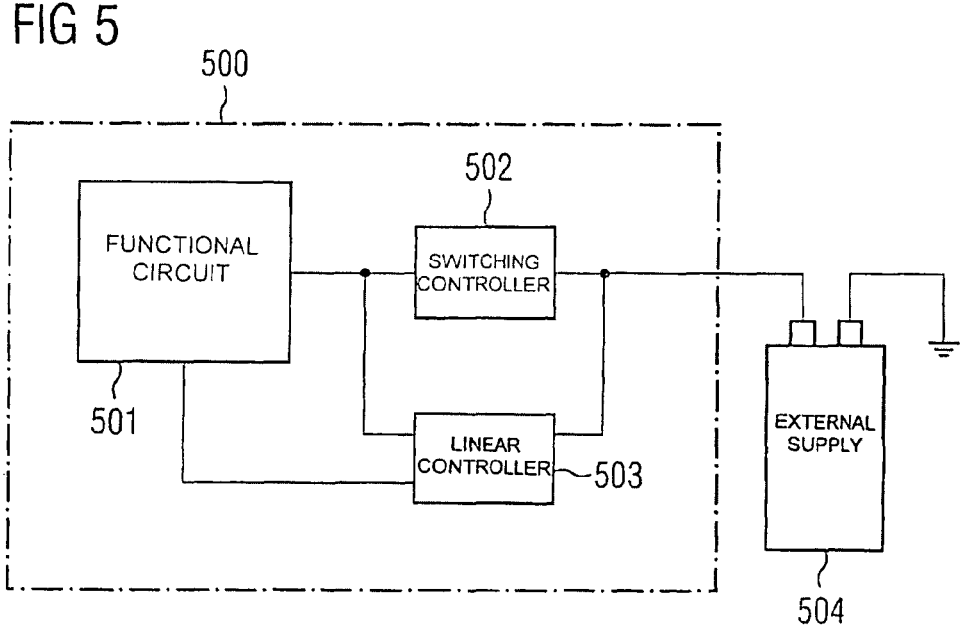
FIG. 5 shows a schematic representation of an integrated semiconductor component in accordance with an embodiment of the invention.

FIG. 5 shows a schematic representation of an integrated semiconductor component 500 in accordance with an embodiment of the invention. The integrated semiconductor component 500 includes a functional block 501, which is coupled with an external power supply unit 504 via a switching controller 502. The external power supply unit 504 can be a battery or an accumulator, for example. A linear controller 503 can be connected in parallel with the switching controller 502 in one embodiment. The linear controller 503 is coupled with the functional block 501 via a control conductor or a control line.

In one possible operation of the semiconductor circuit, the voltage, which is generated by the linear controller 503, is slightly (e.g. minimal) higher than the output voltage of the switching controller 502 in a certain switching operation. This holds true, in one embodiment when the linear controller 503 is taken into operation by means of a control signal provided by the functional block 501 via the control conductor or the control line. Due to the slightly increased voltage, which is generated by the linear controller 503, the controlling effect of the switching controller 502 will automatically be switched off, since the supply voltage at the functional block is provided only by the linear controller 503. Thus, no disturbing switching frequencies of the control by the switching controller 502 is transmitted to the functional block 501.

Another possibility of operation of the shown embodiment may be seen in that the linear controller 503 has a slightly lower voltage in relation to the output voltage of the switching controller 502, so that the output signal of the switching controller 502 is always dominant and supplies the functional block with voltage. In this case, the switching controller 502 would be switched off in case the interferences are undesired. The supply voltage would then be provided by the linear controller 503.

Figure 6A:
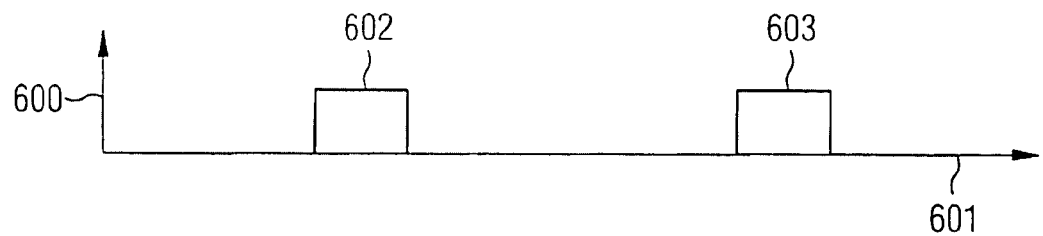
FIGS. 6A to 6C show a schematic representation of control signals when operating the integrated semiconductor component shown in FIG. 5.
Figure 6B:
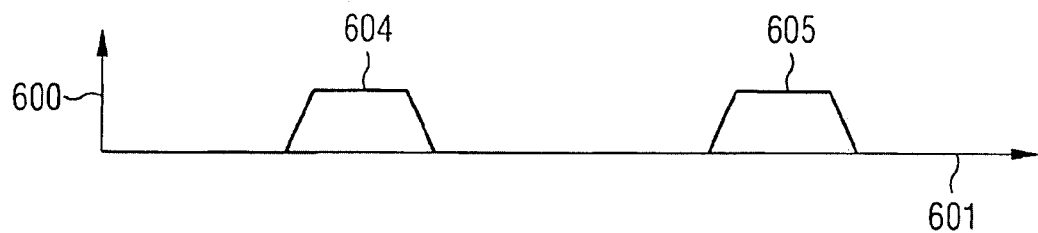
Figure 6C:
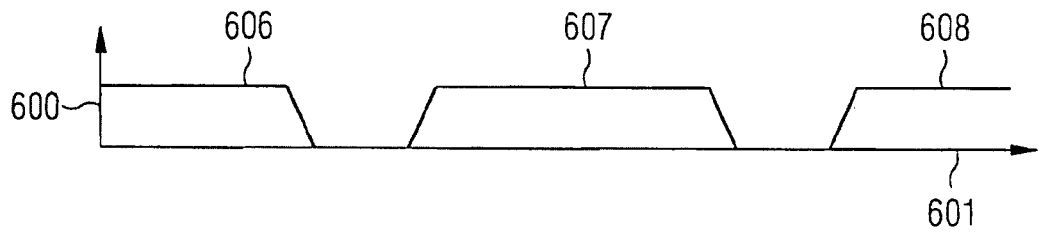

FIGS. 6A to 6C show the operation of the embodiment shown in FIG. 5 using a functional block, which represents a transceiver device.

In this case, FIG. 6A shows a control signal for controlling the high frequency functionality in the functional block 501, FIG. 6B shows a second control signal for controlling the operation of the linear controller 503, and FIG. 6C shows a third control signal for representing the operation state of the switching controller 502. In all three FIGS. 6A to 6C, the time is plotted on the abscises 601 whereas a switching state is represented on the ordinate 600. If a signal exists, the respective functional unit is in operation. FIGS. 6A, 6B, 6C are shown such that the time periods of the abscissas 601 respectively correspond to each other. In FIG. 6C, at a first state 606, the switching controller is in operation, whereas the functional block 501 is not in a transmitting state, and the linear controller 503 is out of operation. At a time instant 602, in contrast thereto, the linear controller 503 is switched-on, and the switching controller 502 is out of operation. The time interval 607 corresponds to the time interval 606, the intervals 603 or 605 correspond to the time intervals 602 and 604, respectively, and the time interval 608 again corresponds to the switching interval 606 and 607, respectively. In the described case, the power control unit derives the voltage reference for the switching controller 502 and the linear controller 503 from a common reference, thereby being in the position to minimize the considered tolerances. In one embodiment of the invention, a signal may be used as control signal for starting running the switching controller 502 and the linear controller 503, wherein the signal is used to switching or to switch-off a high frequency unit or a transmitting unit in the functional block 501. In another embodiment of the invention, the switching controller 502 can be switched-off and the linear controller 503 can be in operation in a stand-by state or an idle state of the integrated semiconductor component, so that the voltage supply for active blocks or the still active units in the functional block 501 can be taken over by the linear controller 503. In this case, no switching signal needs to be provided for the switching controller 502.

It is conceivable that the switching element of the switching controller 502, for example the switching element shown in FIG. 3 and FIG. 4, respectively, and the control transistor of the linear controller 503, for example the linear controller 401 in FIG. 4, are implemented with the same transistors or with the same transistor. In the case that the switching controller 502 is configured as DC converter or step-down-(Buck) converter, the feedback signal in the switching controller 502 can be selected to be unequal to the feedback signal of the linear controller 503. It is also conceivable that both signals are equal. In an improvement of the stability of the linear controller 503, a switching transistor being parallel to the inductance may be selected.

In one embodiment of the invention, the switching between the linear controller 503 and the switching controller 502 may result from control signals that are switched strenuously at a switching clock of the switching controller 502 between the switching controller 502 and the linear controller 503. By way of example, this means that it is switched at a point, at which the current through the inductance of the switching controller 502 is minimal, in case a short-circuit switch for the inductance is provided, or at which the current through the inductance of the switching controller 502 is maximal, in case the inductance remains in the output circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An integrated semiconductor component, comprising:
a functional circuit; and
a power control circuit configured to generate a supply voltage from an input voltage for use by the functional circuit;
wherein the power control circuit comprises a switching controller, a linear controller connected in parallel with the switching controller, and a control circuit, wherein the control circuit is configured to set a frequency spectrum of the supply voltage via a control signal to the switching controller; and
wherein the control circuit is configured to determine a current operating state out of at least two possible operating states of the functional circuit, and set the frequency spectrum based on the current operating state.

2. The integrated semiconductor component of claim 1, wherein the linear controller which is also coupled to the functional circuit.

3. The integrated semiconductor component of claim 1, wherein the power control circuit is configured to provide the supply voltage to the functional circuit.

4. The integrated semiconductor component of claim 1, wherein the power control circuit is configured to provide a supply voltage to an external circuit that is external to the integrated semiconductor component.

5. The integrated semiconductor component of claim 1, wherein the functional circuit comprises a transceiver circuit.

6. The integrated semiconductor component of claim 5, wherein a first operating state is a transmitting state of the transceiver circuit, and wherein a second operating state is a receiving state of the transceiver circuit.

7. The integrated semiconductor component of claim 1, wherein the switching controller is operable to generate the supply voltage with the control signal having a first switching frequency or with a second switching frequency.

8. The integrated semiconductor component of claim 7, wherein the first switching frequency and the associated harmonic switching frequencies associated therewith are different from an internal reference frequency of the functional circuit.

9. The integrated semiconductor component of claim 8, wherein the internal reference frequency is an oscillator signal of a local oscillator of the functional circuit.

10. The integrated semiconductor component of claim 8, wherein the internal reference frequency is a clock frequency of the functional circuit.

11. A method for controlling a supply voltage of a functional circuit in an integrated semiconductor component, the method comprising:
determining a current operating state of the functional circuit;
setting a switching spectrum of a switching signal for a switching controller within a power control circuit based on a current operating state, wherein the switching signal is employed by the switching controller to generate the supply voltage; and
supplying a voltage higher or lower than the supply voltage generated by the witching controller, the voltage being higher or lower provided by a linear controller disposed in parallel with the switching controller.

12. The method of claim 11, wherein the current operating state is a receiving state of the functional circuit.

13. The method of claim 12, wherein the switching spectrum of the switching signal is different from a receiving frequency of the functional circuit in the receiving state.

14. The method of claim 13, wherein all harmonic waves of the switching signal are outside a receiving spectrum of the functional circuit in the receiving state.

15. An integrated semiconductor component, comprising:
a functional circuit means; and
a power control means for generating a supply voltage from an input voltage for use by the functional circuit means;
wherein the power control means comprises a switching means, a linear means connected in parallel with the switching means, and a control means for setting a frequency spectrum of the supply voltage via a control signal to the switching means; and
wherein the control means determines a current operating state out of at least two possible operating states of the functional circuit means and sets the frequency spectrum based on the current operating state.

16. An integrated semiconductor component, comprising:
a functional block; and
a power control unit configured to generate a supply voltage from an input voltage for use by the functional block;
wherein the power control unit comprises a switching controller, a linear controller connected in parallel with the switching controller, and a control unit, wherein the control unit is configured to set a frequency spectrum of the supply voltage via a control signal to the switching controller; and wherein the control unit is configured to determine a current operating state out of at least two possible operating states of the functional block and set the frequency spectrum based on the current operating state.

17. The integrated semiconductor component of claim 16, wherein the linear controller is also coupled to the functional block.

18. The integrated semiconductor component of claim 16, wherein the power control unit is configured to provide the supply voltage to the functional block.

19. The integrated semiconductor component of claim 16, wherein the power control unit is configured to provide the supply voltage to an external unit that is external to the integrated semiconductor component.

20. The integrated semiconductor component of claim 16, wherein the functional block comprises a transceiver.

21. The integrated semiconductor component of claim 20, wherein a first operating state is a transmitting state of the transceiver, and wherein a second operating state is a receiving state of the transceiver.

22. The integrated semiconductor component of claim 16, wherein the switching controller is operable to generate the supply voltage with the control signal having a first switching frequency or a second switching frequency based on the determined current operating state.

23. The integrated semiconductor component of claim 22, wherein the first switching frequency and the associated harmonic switching frequencies associated therewith are different from an internal reference frequency of the functional block.

* * * * *